(12) United States Patent
Breel et al.

(10) Patent No.: US 12,708,132 B2
(45) Date of Patent: Aug. 18, 2026

(54) FOOD PRODUCTION DEVICE

(71) Applicant: PLANT MEAT MAKERS B.V., Ede (NL)

(72) Inventors: Ernst Jan Breel, Ede (NL); Birgit Laura Dekkers, Ede (NL)

(73) Assignee: PLANT MEAT MAKERS B.V., Ede (NL)

( * ) Notice: Subject to any disclaimer, the term of this patent is extended or adjusted under 35 U.S.C. 154(b) by 982 days.

(21) Appl. No.: 17/758,289

(22) PCT Filed: Jan. 4, 2021

(86) PCT No.: PCT/EP2021/050026

§ 371 (c)(1),
(2) Date: Jun. 30, 2022

(87) PCT Pub. No.: WO2021/136846

PCT Pub. Date: Jul. 8, 2021

(65) Prior Publication Data

US 2022/0369686 A1 Nov. 24, 2022

(30) Foreign Application Priority Data

Jan. 3, 2020 (NL) ..................................... 2024603

(51) Int. Cl.
*A23P 30/20* (2016.01)
*A23J 3/22* (2006.01)

(52) U.S. Cl.
CPC ............... *A23P 30/20* (2016.08); *A23J 3/227* (2013.01)

(58) Field of Classification Search
CPC ........... A23J 3/227; A23P 30/00; A23P 30/20
(Continued)

(56) References Cited

U.S. PATENT DOCUMENTS 3,346,403 A * 10/1967 Carruthers ............ B65B 25/061 141/1
4,816,279 A * 3/1989 Katoh ..................... A23P 30/20 426/643

(Continued)

FOREIGN PATENT DOCUMENTS

CN 209732508 * 12/2019
EP 0250623 A1 1/1988

(Continued)

*Primary Examiner* — Ibrahime A Abraham
*Assistant Examiner* — Joseph W Iskra
(74) *Attorney, Agent, or Firm* — FisherBroyles, LLP; Roger L. Browdy; Ronni S. Jillions

(57) ABSTRACT

The present invention relates to a food production device, configured to provide texture to a mass of viscoelastic food-stuff material, which comprises an outer member (10), an inner member(21), which is disposed in an interior of the outer member (10) and a lid (22). A texturizing chamber (2) of the device is formed between the outer member (10) and the inner member (21), for receiving and retaining the mass of viscoelastic foodstuff material during use, and the lid (22) is configured to close-off the texturizing chamber (2) from its surroundings. The outer member (10) and the inner member (21) are rotatable with respect to each other to effect a shear stress with the outer member (10) and the inner member (21), which is configured to act onto the foodstuff material in the texturizing chamber (2). The outer member (10) comprises a bottom wall (12) at a bottom end of the outer member (10) and a top end opening at a top end of the outer member. The lid (22) is configured to be mounted at the top end of the outer member (10) to close-off the top end opening.

15 Claims, 1 Drawing Sheet

(58) Field of Classification Search
USPC ........................................................... 99/367
See application file for complete search history.

(56) References Cited

U.S. PATENT DOCUMENTS

| | | | | |
|---|---|---|---|---|
| 6,673,371 | B2 * | 1/2004 | Brown | A61K 8/442 424/70.13 |
| 8,469,697 | B2 * | 6/2013 | Lindee | B29C 37/0003 425/572 |
| 9,604,236 | B2 * | 3/2017 | Sandahl | B05B 9/0861 |
| 2008/0014330 | A1 | 1/2008 | Chen | |
| 2011/0003975 | A1 * | 1/2011 | Arase | A23J 3/08 530/402 |

FOREIGN PATENT DOCUMENTS

| | | | |
|---|---|---|---|
| EP | 2250906 | A1 | 11/2010 |
| EP | 3586645 | A1 | 1/2020 |
| GB | 1448875 | A | 9/1976 |
| WO | 0236086 | A1 | 5/2002 |
| WO | 2017012625 | A1 | 1/2017 |

* cited by examiner

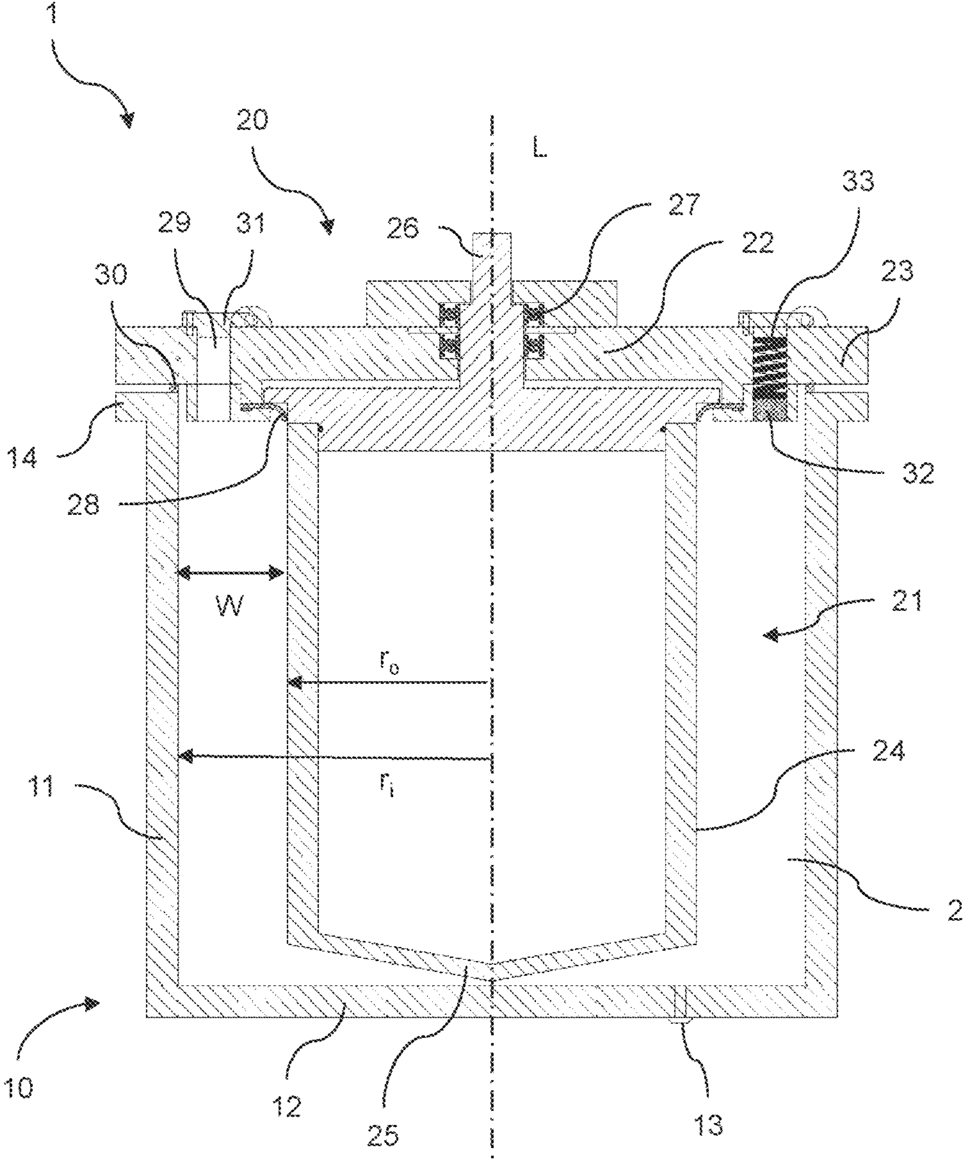
1
20
L
26
27
22
33
23
29
31
30
14
28
32
W
21
$r_o$
$r_i$
24
11
2
10
12
25
13

FOOD PRODUCTION DEVICE

FIELD OF THE INVENTION

The present invention relates to a food production device. The present invention further relates to a method for providing texture to a mass of viscoelastic foodstuff material.

STATE OF THE ART

In the past, extensive research was carried out in the field of meat-free foodstuff material, for example biopolymer mixtures for meat substitutes. It was found that both the flavour and the texture of the foodstuff material are important parameters to accurately mimic actual meat. As far as flavour is concerned, significant developments have been made. However, the texture of the meat substitutes was generally not sufficient. In particular, known meat substitutes have a granular or flaked texture, whereas actual meat has a fibrous texture.

A prior art food production device for providing texture to a mass of viscoelastic foodstuff material is known from Krintiras et al., Journal of Food Engineering 169 (2016), 205-213. In this publication, the food production device comprises an outer cylinder, having an interior, and an inner member, which is disposed in the interior of the cylinder. In between the cylinder and the inner member, an annular interior of the food production device is defined, in which the foodstuff material is received during use of the device. The cylinder comprises an entrance port in its cylindrical wall, through which the foodstuff material is pressed into the interior. Furthermore, the cylinder comprises a lid, which covers an opening in the cylindrical wall and which can be removed from the cylinder to expose the opening, in order to allow for discharge of texturized foodstuff material from the interior.

Although this known food production device is able to provide acceptable textured foodstuff material, the operation of the device is rather cumbersome. First of all, the foodstuff material needs to be injected into the interior of the device by means of a specialized high-pressure injector. As the result of the high pressure and the elevated shear rate that occur during filling, a certain amount of undesired and uncontrolled texturizing already takes place during filling. Furthermore, the injector is not able to inject all sorts of masses of viscoelastic foodstuff material, since some compositions may have a viscosity that is not compatible with injection-type filling methods. Finally, the injector is a large and expensive component of the entire system, taking up a large amount of space at a production site and being associated with higher production costs. Other drawbacks include: limited control on the degree of filling of the device, unwanted inclusions of air bubbles in the foodstuff material and/or pressing out of air from the foodstuff material, additional parts for cleaning, which slows down the texturizing process, and the establishing of a connection between the filling device and the food production device for each texturizing cycle, also slowing down the process.

Secondly, the known device comprises the lid in the cylindrical wall, which causes local variations in the heat profile of the heated cylinder, as well as forming an increased risk to become subject of leakages under the influence of high pressures and temperatures in the device. The large opening for the filling device furthermore introduces temperature fluctuations and a mechanical weakness in the cylindrical wall of the device. Additionally, the opening and the closing of the lid involves time and therefore slows down the texturizing process as well.

Thirdly, the known device is hard to clean, due to limited access to the interior via the opening in the cylindrical wall, and the known device comprises two seals at the locations where a rotation axle of the inner member protrudes through the cylindrical wall, wherein these seals are prone to wear.

OBJECT OF THE INVENTION

It is an object to provide a food production device that overcomes one or more of these drawbacks of the known food production device, or at least to provide an alternative food production device.

DESCRIPTION OF THE INVENTION

The present invention provides a food production device, in particular a food texturizing device, configured to provide texture to a mass of viscoelastic foodstuff material, such as a biopolymer mixture for animal protein substitutes, such as meat, fish and poultry substitutes, which comprises:

an outer member, comprising a cylindrical wall that extends around a longitudinal axis, wherein an interior of the outer member is defined by the cylindrical wall and wherein the outer member comprises an opening by which access is provided towards its interior, an inner member, which comprises an outer wall having a shape that substantially corresponds to the shape of the cylindrical wall of the outer member, wherein, at least during use, the inner member is disposed in the interior of the outer member and the outer wall of the inner member faces the cylindrical wall of the outer member, wherein, at least during use, a closed-off texturizing chamber of the food production device is formed between the outer member, e.g. the cylindrical wall of the outer member and the inner member, e.g. the outer wall of the inner member, for receiving and retaining the mass of viscoelastic foodstuff material during use, and a lid, which is configured to be mounted over the opening to close-off the texturizing chamber from its surroundings and configured to be opened to provide access towards the texturizing chamber when the texturizing has finished, wherein the outer member and the inner member are rotatable with respect to each other around a rotation axis that is parallel to the longitudinal axis, to effect, during use, a shear stress with the outer member and the inner member, which is configured to act onto the foodstuff material in the texturizing chamber, characterized in that, the outer member comprises a head end wall at a first head end thereof, preferably a bottom wall at a bottom end of the outer member, wherein the opening is a head end opening at a second head end of the outer member, opposite to the first head end, preferably a top end opening at a top end of the outer member, wherein the lid is configured to be mounted at the second head end of the outer member to close-off the head end opening, preferably configured to be mounted at the top end of the outer member to close-off the top end opening.

The present invention provides a device for providing texture to a mass of viscoelastic foodstuff material in a manner that overcomes the drawbacks of the known devices. The foodstuff material that is texturized in the food production device is a viscoelastic material that may have a dry matter content of more than 20%. An example of such as biopolymer mixtures for meat substitutes. Prior to the texturizing, these foodstuff materials may have a paste-like or dough-like appearance. During the texturizing, fibres are introduced into the foodstuff material and the resulting end product may be a solid.

The food production device comprises an outer member that has an interior in which the mass of the viscoelastic foodstuff material is received during use of the device. The interior of the outer member is defined by the cylindrical wall thereof, which is advantageously embodied with a circular cross-section, but which may as well comprise an ellipsoid or a polygonal shape. The cylindrical wall extends along a longitudinal axis, wherein the longitudinal axis spans between a first head end and a second head end of the outer member.

Similar as with the known device, the interior is accessible from the outside by means of an opening. Compared to the known devices, however, the opening is provided at a head end of the outer member, instead of in the cylindrical wall. The head end opening is convenient for several purposes, such as for filling the interior of the outer member with the mass of viscoelastic foodstuff material and for cleaning the interior of the outer member after the device has been used.

Furthermore, the device according to the present invention allows for mixing of components of the foodstuff material in the interior of the outer member and, after filling thereof, transporting the outer member independently of the inner member assembly (e.g. for easy handling or process optimization), allowing to multiplex the device in a cost-effective way.

The inner member of the device is adapted to be positioned in the interior of the outer member during use of the device. A part of the interior of the outer member is therefore occupied by the inner member, after it has been positioned in the interior of the outer member.

The inner member has an outer wall with a shape that corresponds to the shape of the cylindrical wall of the outer member, thereby advantageously having a circular cross-section as well. Alternatively, the cylindrical wall may as well comprise a cross-section with an ellipsoid or a polygonal shape. The outer wall of the inner member faces the cylindrical wall of the outer member during use of the device, when the inner member is arranged in the interior of the outer member.

The texturizing chamber is formed in the space between the cylindrical wall of the outer member and the outer wall of the inner member. In the texturizing chamber between the inner member and the outer member, the texture is applied to the mass of viscoelastic foodstuff material upon effecting a relative rotation between the inner member and the outer member, in order to subject the mass of viscoelastic foodstuff material to a shear stress. Under the influence of the applied shear stress, the viscoelastic foodstuff material is aligned and deformed in the shear flow direction. The texturizing chamber is closed-off from the surroundings, so that when, at least during use, the inner member is arranged in the outer member and the lid is provided on the outer member, no openings towards the texturizing chamber are provided through which the foodstuff material could escape from the texturizing chamber or through which new foodstuff material can be fed into the texturizing chamber.

Simultaneously, the mass of viscoelastic foodstuff material is heated, in order to lower the viscosity of the foodstuff material and to mobilize the biopolymers to effect alignment. The aligned mass results in texture of the foodstuff material, being aligned in the direction of the relative rotation between the inner member and the outer member.

After the heating, the texturized foodstuff material in the texturizing chamber may be cooled to relieve the pressure inside. This cooling may provide that the viscosity of the foodstuff material increases up to a certain extent, which immobilizes the biopolymers again. Accordingly, the texture may be maintained in the foodstuff material.

For using the device, the mass of viscoelastic foodstuff material is initially present in the interior of the outer member, but when the inner member is introduced in the interior of the outer member, the foodstuff material is displaced by the inner member towards the texturizing chamber of the device, between the inner member and the outer member.

This filling of the texturizing chamber is more convenient than it is in the prior art device. Hence, the mass of viscoelastic foodstuff material can be loaded in the interior of the outer member via the opening. Since the volume of the texturizing chamber is relatively small, compared to the volume of the interior of the outer member, also the amount of loaded foodstuff material is relatively small compared to the interior of the outer member, providing for convenient loading. Only when the inner member is introduced in the interior of the outer member, the mass of viscoelastic foodstuff material is displaced outwardly under the influence of the inner member. Accordingly, the device according to the present invention may be used for more different types of foodstuff materials, since a broader range of viscosities can be handled, because the allowed viscosities are no longer limited by the filling device.

In the prior art device, the filling of the texturizing chamber takes place in a single step, e.g. via the injector that is complex to use. Instead, the present invention allows for convenient filling in two steps: first, the interior of the outer member is loaded with the foodstuff material, which does not require any pressure, and secondly, the inner member is introduced to form the texturizing chamber for the foodstuff material.

The device according to the present invention further comprises a lid, which is to be mounted over the opening during use of the device, for closing-off the interior of the outer member and thus also for closing-off the texturizing chamber. Since the opening in the outer member is a head end opening, the lid is a corresponding head end lid, to be mounted over the head end opening of the outer member.

The outer member comprises a head end wall at a first head end, for closing-off the interior of the outer member at this first head end. The head end wall may be a solid wall that is free of openings, in order to provide for a relatively simple construction, thus allowing for improved cleaning of the interior of the outer member.

The outer member further comprises a second head end that is, seen along the longitudinal axis, located opposite to the first head end. The head end opening of the outer member is provided at the second head end of the outer member. The head end opening into the interior of the outer member is thus provided opposite to the head end wall of the outer member that delimits the interior thereof.

In general, the food production device according to the present invention is smaller than the device from prior art. This is in particular the result of the omission of the injector of the prior art device, since the present device can be conveniently loaded in two steps, without the use of a large and complicated injector.

Furthermore, the fact that the outer member comprises a head end wall at its first head end and a head end opening at its second head end, provides for less leakage than with the prior art device. The inner member is inserted in the interior of the outer member only via the head end opening, which may require only a single sealing location at the interface between the inner member and the outer member. This single sealing location may provide for reduced leakage, when compared to the prior art device that comprises two rotational seals in both head end walls of the outer member and a seal between the removable lid and the cylindrical wall of its outer member.

Furthermore, the device according to the present invention may not need axial movement between the inner member and the lid, whereas the known device did require such movements. Accordingly, in the absence of axial movements, the seals in the device according to the present invention may be less prone to wear.

Finally, the device according to the present invention also allows for improved cleaning, since the head end wall at the first end of the outer member may, together with the cylindrical wall of the outer member, form a smooth delimitation of the interior of the outer member. Furthermore, the head end opening provides for convenient access to the interior of the outer member to further simplify the cleaning.

The food production device is configured to rotate the inner member and the outer member with respect to each other at a rotational velocity in the range between 5 and 150 rpm. It was found by the inventors that when the foodstuff materiel were to be subjected to a rotational velocity in the range of 5-150 rpm, e.g. for a biopolymer mixture for animal protein substitutes, the texture of the foodstuff material would become as best as possible, namely to accurately mimic that of actual meat, poultry or fish products.

If the foodstuff material were to be subjected to a lower shear rate, the resulting structure in the foodstuff material is only minorly texturized and shows only limited anisotropy. If, on the other hand, the foodstuff material were to be subjected to a higher shear rate, the resulting food stuff material would be destroyed.

In an embodiment, the lid comprises an opening that allows access to the texturizing chamber when the lid is in place on the outer member. Such a configuration may provide that the mass of foodstuff material can be loaded into the texturizing chamber through this opening in the lid, without requiring the entire lid to be removed from the outer member.

In an embodiment, the outer member is, at least during filling of its interior, arranged in a standing, upright position. In the upright position, the longitudinal axis of the outer member is aligned with the vertical direction and the first head end is a bottom end of the outer member. Accordingly, the head end wall is a bottom wall, by which the device may rest on a ground plane and which forms a bottom for the interior of the outer member. The second head end is thereby a top end of the outer member and the head end opening is provided as a top opening, allowing access into the interior of the outer member from above.

In this embodiment, the head end opening at the top end allows for convenient loading of the foodstuff material from above, under the influence of gravity, instead of with the complicated injector from the prior art device. Furthermore, the inner member may be easily inserted into the interior of the outer member from the top as well, for example by means of an overhead crane to lift the inner member. Accordingly, the gravitational force on the inner member may contribute in outwardly displacing the loaded mass of viscoelastic foodstuff material in the interior of the outer member upon lowering of the inner member.

In an embodiment, the lid and the inner member together form a lid assembly that is removable from the outer member to allow access to the interior of the outer member. The lid assembly thereby provides that the lid and the inner member may be removed from the outer member together, e.g. in a single step. As such, the operation of the device may be further simplified to further improve the efficiency of providing texture to the mass of viscoelastic foodstuff material.

In an additional embodiment, the lid assembly comprises a stationary portion, which is configured to be attached to the outer member, and a rotary portion within the stationary portion, wherein the rotary portion is rotatable with respect to the stationary portion and wherein the inner member is fixedly connected to the rotary portion.

The lid assembly may thereby be fastened to the outer member by means of the stationary portion, which provides the advantage that an improved sealing may be created between the stationary portion and the outer member, since those two parts of the device do not move with respect to each other and thus require no rotating seals, but rather only stationary seals. Stationary seals are less prone to wear and leakage than rotating seals, which implies that this configuration is less prone to wear and leakage.

Furthermore, the inner member is fixedly connected to the rotary portion of the lid assembly and thereby configured to rotate along with the rotary portion, relative to the stationary portion.

The rotary portion is arranged within the stationary portion, for example being arranged concentrically with the stationary portion. Accordingly, the relative rotation between the inner member and the outer member is facilitated by the relative rotation between the rotary portion and the stationary portion.

Since the relative rotations between the inner member and the outer member are only guided by the relative rotation between the rotary portion and the stationary portion of the lid assembly, the interface between the rotary portion and the stationary portion is the only location that requires a rotating seal. The prior art device at least requires two rotating seals, which means that the present device will be less prone to wear and leakage, due to the fewer seals.

In an embodiment, the outer member does not need to comprise any ball bearing components to guide the rotations of the inner member, but a sliding bearing instead, which may provide that the outer member can be provided less complex and that it may allow for improved cleaning. Alternatively, however, the inner member and the outer member may comprise a ball bearing and a separate seal in between them.

In a further embodiment, the device comprises a shaft seal, e.g. a food-grade shaft seal, in between the rotary portion and the stationary portion. This shaft seal is in particular able to prevent leakage between the rotary portion and the stationary portion under the influence of a pressure difference between the texturizing chamber and the surroundings of the device.

The shaft seal may be embodied as an insert element, which is inserted in a cavity of the stationary portion, e.g. of the lid, and which comprises a through passage in which part of the rotary portion, e.g. the inner member is located. Such an insert seal element may be made of a plastic material and may have the benefit that it can be removed easily from the lid assembly in order to be cleaned or to be replaced in case it has worn out.

In an embodiment, the inner member comprises a displacement mechanism, such as a cone-shaped end portion, a convex end portion and/or a screw portion, which faces, at least during use of the device, the head end wall of the outer member. The displacement mechanism is configured to effect the outward displacement of the mass of viscoelastic foodstuff material in the interior of the outer member when the inner member is inserted therein. The displacement mechanism may reduce the required force for inserting the inner member in the outer member, and may therefore further facilitate the filling of the texturizing chamber.

The cone-shaped end portion can be shaped as a cone with a sharp tip that faces towards the head end wall of the outer member, wherein the tip is configured to penetrate the mass of viscoelastic foodstuff material that has been loaded in the interior of the outer member. During use of the device, the tip may be arranged in the close proximity of the head end wall, in order to reduce the volume in between the displacement mechanism and the head end wall since the texturizing may be less effective there.

Similarly, the convex displacement mechanism may comprise a blunted tip, which may provide for an even further reduced volume between the displacement mechanism and the head end wall, while still having sufficient displacement properties.

The screw portion of the displacement mechanism may further contribute in outwardly displacing the mass of viscoelastic foodstuff material in the interior of the outer member, e.g. in particular when the inner member and the outer member were to be slightly rotated with respect to each other upon insertion in the interior of the outer member to create the screw effect.

In an embodiment, the head end wall of the outer member comprises an inverse cone-shaped end portion, a concave end portion and/or a screw portion, which faces, at least during use of the device, the inner member. The head end wall may thereby have the same effect of the displacement mechanism described above, having the same, but inverse shape.

According to this embodiment, only the head end wall may comprise an inverse cone-shaped end portion, a concave end portion and/or a screw portion, while having a flat inner member facing towards the head end wall.

However, also both the inner member and the head end wall may each comprise a respective cone-shaped and inverse cone-shaped end portion, a convex and concave end portion and/or a screw portion to further improve the displacement effect on the mass of viscoelastic foodstuff material upon inserting the inner member in the interior of the outer member.

In an embodiment, the inner member is hollow, having an interior, and the lid has an annular shape that defines a through passage towards the interior of the inner member. In the assembled configuration of the device, with the inner member being placed in the interior of the outer member, the interior of the inner member may be accessed from the surroundings of the device.

The annular lid may example have a ring shape in between the inner member and the outer member and may additionally comprise one or more spokes, which may extend towards a central part of the lid. The spokes may for example guide the relative rotation between the inner member and the outer member.

With the hollow inner member, the texturizing chamber may be heated and cooled both via the wall of the inner member and via the cylindrical wall of the outer member, so that the amount of heat fed into the texturizing chamber during heating or the amount of heat drawn out of the texturizing chamber during cooling may be increased, compared to an inner member that is not hollow, thereby improving the production rate that can be achieved with the food production device.

The interior of the inner member may be provided with a heating device and/or a cooling device for heating and/or cooling the inner member in order to heat and/or cool the mass of viscoelastic foodstuff material in the texturizing chamber. The heating and the cooling may be carried out via forced air ventilation, for example in the interior of the inner member and/or around the outer member or may be effected via a jacket around the outer member.

In an embodiment, the lid assembly further comprises an electric motor that is attached to the lid, wherein the electric motor is configured to rotate the inner member with respect to the lid. In particular, the lid is configured to be fixedly mounted on the outer member for covering the head end opening thereof, which implies that the electric motor is also positioned stationary with respect to the outer member. During operation of the device, the electric motor may rotate the inner member, while the electric motor and the outer member remain stationary. This embodiment may allow for a relatively simple construction of the device, in which the outer member can be stationary positioned at a desired location, for example with the head end wall on a ground plane.

In an embodiment, the device comprises a frame, wherein the inner member is attached to the frame, and wherein the outer member is rotatable with respect to the frame and the inner member. In this embodiment, the inner member is held stationary during use of the device, e.g. when rotating the inner member with respect to the outer member, and the outer member is rather rotated. This embodiment may be beneficial in case the heating of the foodstuff material in the texturizing chamber is carried out indirectly, for example when the entire food production device, e.g. the outer member, inner member and lid were to be placed in or to be transported through a heated chamber. With the inner member not being rotated with respect to the chamber, preferably being held stationary in the chamber by means the frame, the rotary outer member may provide for even heating of the texturizing chamber, since all parts of the outer member will be heated evenly as a result of the rotation.

In a further embodiment, the device also comprises an electric motor, which is also attached to the frame, and which is configured to rotate the outer member with respect to the frame and the inner member. Here, both the electric motor and the inner member are held stationary during use of the device, e.g. when rotating the inner member with respect to the outer member, and the outer member is rather rotated. A further advantage of this configuration is that heating devices and cooling devices may be disposed in the stationary inner member, where they may be more effective than in the outer member, without requiring complicated rotary connectors for transmitting electric signals and/or heating and cooling fluids.

In an embodiment, the electric motor may be provided separate from the outer member and the inner member. Here the electric motor may comprise a motor coupling and the inner member or the outer member may comprise a complementary coupling, which can releasably interlock with each other. Once interlocked, the couplings may transmit a rotary torque from the electric motor to the inner member or outer member. However, the electric motor may be released from the inner member or outer member, which may, for example, be beneficial during cleaning, so that the electric motor will not be subjected to the cleaning process and that the remaining inner member or outer member, e.g. without the electric motor, can be cleaned more easily.

In an embodiment of the device, at least during use of the device, the inner member is aligned off-centre with the outer member and the rotation axis is offset with respect to the longitudinal axis. As such, a width of the texturizing chamber between the outer wall of the inner member and the cylindrical wall of the outer member may vary around the circumference of the texturizing chamber, in order to obtain localized shearing properties during relative rotation between the inner member and the outer member.

Alternatively, the inner member may be aligned concentric with the outer member, wherein the rotation axis is in line with the longitudinal axis, to obtain a constant width of the texturizing chamber around the circumference, in order to obtain constant shearing properties during relative rotation between the inner member and the outer member.

In an embodiment, the lid comprises a first locking element and the outer member comprises a corresponding second locking element at its second head end, wherein the first and second locking elements are configured to interlock, in order to effect closure of the lid on the outer member. By means of the interlocking first and second locking elements, the lid can be rigidly connected to the outer member, in order to provide a leak-free sealing between the texturizing chamber and the surroundings of the device. This sealing may provide that a pressure difference, compared to the ambient pressure, can be built-up in the texturizing chamber during use of the device.

For example, the second locking element on the outer member comprises a flange at the second head end, e.g. at the top end of an upright outer member, underneath which the first locking element of the lid, embodied as pawls, may interlock. The flange may thereto comprise interruptions, which are arranged in a pattern that corresponds to a pattern of the pawls. During locking and unlocking, the pawls can protrude through the interruptions, after which the locking is achieved by effecting a relative rotation between the outer member and the lid to position the pawls underneath the flange.

In an alternative embodiment, the lid and the outer member may be free of locking elements. Instead, the lid and the outer member may then be held on top of each other by an external assembly to hold the texturizing chamber closed. The external assembly may for example comprise a frame in between which the outer member and the lid are to be clamped.

In an embodiment, the device comprises an annular seal at an interface between the lid and the outer member, for example comprising an annular seal ring in the lid that is configured to abut the cylindrical wall of the outer member at its second head end. This annular seal ring may be made from a material that is softer than the material of the outer member and the lid, such that the annular seal ring is configured to deform when the lid is mounted on the outer member.

For example, the lid and the member are at least partially made of a stainless steel material and the annular seal ring is made from an elastomer material, such as rubber.

In an embodiment, the cylindrical wall has an inner radius and the outer wall of the inner member has an outer radius, wherein a width of the texturizing chamber is defined as the difference between the inner radius of the cylindrical wall and the outer radius of the outer wall of the inner member, and wherein the width is in a range between 5 mm and 100 mm, preferably in a range between 10 mm and 50 mm. As described above, the width of texturizing chamber may either be constant around the circumference of the texturizing chamber, which may be the case when the outer member is aligned concentric with the inner member. Alternatively, the width of texturizing chamber may vary around the circumference of the texturizing chamber, which may be the case when the outer member is aligned off-centre with the inner member.

In an embodiment, the cylindrical wall of the outer member and/or the outer wall of the inner member comprises a corrugated surface to increase contact between the respective wall and the foodstuff material during use of the device. The corrugated surface for example comprises grooves and ridges that are aligned parallel to the longitudinal axis. The corrugated surface has the effect that the friction between the mass of viscoelastic foodstuff material and the cylindrical wall of the outer member and/or the outer wall of the inner member is increased compared to when the cylindrical wall and the outer wall were to be provided as smooth walls. With an increased friction on the mass of viscoelastic foodstuff material, the shear stress that is applied on the mass of viscoelastic foodstuff material during use of the device can be increased, in order to alter the texture that is provided onto the foodstuff material.

The corrugations may extend over the entire surface of the cylindrical wall and/or the inner wall, for example as lengthwise ridges and grooves that extend parallel to the longitudinal axis and around the entire circumference of the texturing chamber. The ridges and grooves may alternatively be arranged in a wave-like pattern or the like.

Additionally or alternatively, the corrugations may comprise localized protrusions that project into the texturizing chamber, when seen from nominal surfaces of the cylindrical wall of the outer member and/or the outer wall of the inner member. These localized protrusions may be arranged in a certain pattern, being spread across the entire surface of the cylindrical wall and/or the inner wall.

In an embodiment, the food production device further comprises a heating device, which is configured to heat the texturizing chamber to heat, at least during use, the mass of viscoelastic foodstuff material. The heating device is configured to increase the temperature of the texturizing chamber to a level that is above the ambient temperature, in order to subject the mass of viscoelastic foodstuff material to an elevated temperature during use of the device.

The required elevated temperature differs per type of foodstuff material, but may for example being in between 50° C. and 200° C. for a protein-rich biopolymer mixture. At these temperatures the pressure in the texturizing chamber increases above the ambient pressure under the influence of the heating, for example being caused by evaporation of liquids, such as water, or by changes in the protein structure under elevated temperatures, in the mass of viscoelastic foodstuff material. The pressure difference between the texturizing chamber and the ambient may increase during use of the device.

At the elevated temperature, the viscosity of the foodstuff material is lowered and the biopolymers are mobilized to effect alignment of the mass. The aligned mass results in texture of the foodstuff material, being aligned in the direction of the relative rotation between the inner member and the outer member.

The heating device may be associated with the outer member and/or inner member, for example being arranged in the cylindrical walls thereof. However, the heating device may also be provided separate from the outer member and inner member, to provide indirect heating for the foodstuff material in the texturizing chamber.

For providing such indirect heating, the heating device may be configured to guide a flow of heated fluid, for example hot air, alongside the cylindrical wall of the outer member and/or along the wall of the inner member, e.g. where the inner member is provided hollow. As such, the heat from the heated fluid can be transferred to the foodstuff material when it is conducted through the cylindrical wall of the outer member and/or through the wall of the inner member. With such indirect heating, the outer member and the inner member do not need to comprise the heating device and can be constructed less complex. This simpler construction may provide for more convenient cleaning and maintenance of the outer member and the inner member.

Alternatively, the heating device may be an infrared heating device, configured to raise the temperature of the foodstuff material in the texturing chamber by means of infrared radiation.

In an embodiment, the heating device can be provided as a heated chamber in which the outer member and inner member are placed. The heating device may heat the fluid in the chamber, for example being air, which heat is then transferred onto the outer member and the inner member, in order to be transferred to the foodstuff material in the texturizing chamber. The heating device may additionally comprise a heating fluid outlet that projects into the hollow inner member, in order to supply the heated fluid inside the inner member.

In a further embodiment, the heating device is provided in the cylindrical wall of the outer member and/or the outer wall of the inner member, wherein the heating device is preferably an electric heating device, such as a resistive heater.

The heating device may be arranged in or on the respective cylindrical wall or outer wall, but may also be arranged at or near a surface of the respective cylindrical wall or outer wall that faces away from the texturizing chamber, for example on the outside of the cylindrical wall of the outer member and/or on the inside of the inner member, for example in the interior thereof.

In this embodiment, the heating device is preferably embodied as a resistive heater, which allows for accurate control of the applied temperature, and which is relatively simple to implement in the device.

Alternatively, the heating device may be as well embodied as a heat exchanger with fluid, e.g. gas or liquid, conduits that are in contact with the respective cylindrical wall and/or the outer wall, through which a flow of a heated medium is facilitated to heat the texturizing chamber.

In an embodiment, the device comprises a pressure regulator mechanism, which is configured to regulate a pressure level in the texturizing chamber. This regulation may prevent that the pressure level in the texturizing chamber, for example being caused by the heating of the foodstuff material during use and the corresponding expansion of the foodstuff material, exceeds a certain threshold pressure level. The pressure regulator mechanism may for example be embodied as a safety valve, e.g. a check valve. Such a valve is normally closed and only configured to open when a pressure level difference over the valve exceeds a critical pressure level difference.

Alternatively or additionally, the pressure regulator mechanism is configured to set a pressure level in the texturizing chamber by itself. The mechanism may thereto be configured to increase or decrease the volume of the texturizing chamber, whilst the texturizing chamber remains sealed to prevent a change in mass of the contents of the texturizing chamber, e.g. of the foodstuff material, water, water vapour and/or air in the texturizing chamber.

Alternatively or additionally, the pressure regulator mechanism may comprise a pressure source, such as a pump, for subjecting the texturizing chamber to a certain pressure level.

In a further embodiment that comprises the lid assembly with the stationary portion and the rotary portion, the stationary portion and the rotary portion are axially movable with respect to each other along the rotation axis and the pressure regulator mechanism is configured to effect axial movements between the stationary portion and the rotary portion in order to move the inner member and the outer member with respect to each other and to change the volume of the texturizing chamber.

Upon axially moving the rotary portion with respect to the stationary portion, the axial position of the inner member with respect to the stationary portion of the lid assembly is changed, which therefore changes the relative axial position between the inner member and the outer member. Since no movements will take place in transverse directions to the rotation axis, the width of the texturizing chamber remains the same. However, the axial distance from the head end wall of the outer member to the inner member, and in particular the displacement mechanism at the head end thereof, will change upon axial movement. Accordingly, the axial movement may effect a change in volume of the portion of the texturizing chamber between the inner member and the head end wall of the outer member. Since the texturizing chamber remains sealed, the mass of the contents of the texturizing chamber, e.g. of the foodstuff material and air in the texturizing chamber, remain the same. Accordingly, the pressure in the texturizing chamber changes upon changing the relative axial position between the inner member and the outer member by axially moving the stationary portion and the rotary portion of the lid assembly.

In an embodiment, the outer member comprises a vent hole in its cylindrical wall or its head end wall, which is configured to provide a fluid passage between the interior of the outer member and its surroundings. The vent hole may be normally closed and is configured to open a fluid passage between the interior of the outer member and the surroundings of the device, in order to balance a pressure difference between the texturizing chamber and the ambient pressure level.

This may be in particular advantageous after using the device for the texturizing, e.g. upon opening the lid and removing the inner member. In the absence of any vent hole, the texturized mass would prevent an inflow of air into the interior of the outer member when the inner member is removed. This would result in a negative pressure in the interior of the outer member, relative to the ambient temperature, giving rise to difficulties in removing the inner member. With the vent hole, an open fluid connection may be achieved between the interior of the outer member and the ambient air, which allows an inflow of air into the interior of the outer member, in order to prevent the negative pressure from being present. Accordingly, the inner member and/or the foodstuff material can be removed more easily, which further improves the convenience of the use of the device.

In an embodiment, the inner member comprises a notch, which is configured to interlock with the foodstuff material upon removal of the inner member from the outer member. As a result of the interlocking, not only the inner member becomes removed, but also the foodstuff material is taken along with the inner member, e.g. out of the interior of the outer member. The removal of the foodstuff material is therewith promoted, since it may no longer remain in the interior of the outer member after removal of the inner member.

The present invention also provides a food production assembly, which comprises the food production device as described herein, preferably as recited one or more of the claims, and a heating device, which is configured to heat the texturizing chamber of the food production device to heat, at least during use, the mass of viscoelastic foodstuff material that is located in the texturizing chamber. The heating device is configured to increase the temperature of the texturizing chamber to a level that is above the ambient temperature, in order to subject the mass of viscoelastic foodstuff material to an elevated temperature during use of the device.

The required elevated temperature differs per type of foodstuff material, but may for example being in between 50° C. and 200° C. for a protein-rich biopolymer mixture. At these temperatures the pressure in the texturizing chamber increases above the ambient pressure under the influence of the heating, for example being caused by evaporation of liquids, such as water, or by changes in the protein structure under elevated temperatures, in the mass of viscoelastic foodstuff material. The pressure difference between the texturizing chamber and the ambient may increase during use of the device.

At the elevated temperature, the viscosity of the foodstuff material is lowered and the biopolymers are mobilized to effect alignment of the mass. The aligned mass results in texture of the foodstuff material, being aligned in the direction of the relative rotation between the inner member and the outer member.

The heating device may be embodied as a heat exchanger with fluid, e.g. gas or liquid, conduits that are in contact with the respective cylindrical wall and/or the outer wall, through which a flow of a heated medium is facilitated to heat the texturizing chamber. The heating device may be associated with the outer member and/or inner member, for example being arranged in the cylindrical walls thereof. However, the heating device may also be provided separate from the outer member and inner member, to provide indirect heating for the foodstuff material in the texturizing chamber.

For providing such indirect heating, the heating device may be configured to guide a flow of heated fluid, for example hot air, alongside the cylindrical wall of the outer member and/or along the wall of the inner member, e.g. where the inner member is provided hollow. As such, the heat from the heated fluid can be transferred to the foodstuff material when it is conducted through the cylindrical wall of the outer member and/or through the wall of the inner member. With such indirect heating, the outer member and the inner member do not need to comprise the heating device and can be constructed less complex. This simpler construction may provide for more convenient cleaning and maintenance of the outer member and the inner member.

Alternatively, the heating device may be an infrared heating device, configured to raise the temperature of the foodstuff material in the texturing chamber by means of infrared radiation.

In an embodiment, the heating device can be provided as a heated chamber in which the outer member and inner member are placed. The heating device may heat the fluid in the chamber, for example being air, which heat is then transferred onto the outer member and the inner member, in order to be transferred to the foodstuff material in the texturizing chamber. The heating device may additionally comprise a heating fluid outlet that projects into the hollow inner member, in order to supply the heated fluid inside the inner member.

The present invention further provides a method for providing texture to a mass of viscoelastic foodstuff material, such as a biopolymer mixture for animal protein substitutes, such as meat, fish or poultry substitutes, which comprises the steps of;

filling an interior of an outer member of a food production device with the mass of viscoelastic foodstuff material through a head end opening of the outer member, placing an inner member in the interior of the outer member through the opening, wherein the inner member comprises an outer wall that at least partially has a circular cross-section, wherein the outer wall faces the cylindrical wall of the outer member, wherein a texturizing chamber is formed between the cylindrical wall of the outer member and the outer wall of the inner member, and wherein the placing of the inner member effects displacing of the foodstuff material into the texturizing chamber;

mounting a lid over the opening in the outer member lid to close-off the texturizing chamber from its surroundings, heating the foodstuff material, rotating the inner member and the outer member with respect to each other around a rotation axis to effect a shear stress with the outer member and the inner member, which acts on the foodstuff material in the texturizing chamber, and cooling the foodstuff material after the heating and the rotating.

Preferably, the method according to the invention is carried out by means of a food production device as described above.

The method according to the present invention is advantageous since, although the interior of the device is accessible from the outside by means of an opening as in the prior art, the opening is provided at a head end of the outer member, instead of in the cylindrical wall.

The head end opening is convenient for several purposes, such as for filling the interior of the outer member with the mass of viscoelastic foodstuff material and for cleaning the interior of the outer member after the device has been used.

The texturizing chamber of the device is formed in the space between the outer member, e.g. the cylindrical wall of the outer member and the inner member, e.g. the outer wall of the inner member. In the texturizing chamber between the inner member and the outer member, the texture is applied to the mass of viscoelastic foodstuff material upon effecting the relative rotation between the inner member and the outer member. As a result of this relative rotation, the mass of viscoelastic foodstuff material is subjected to a shear stress. Under the influence of the applied shear stress, the mass of viscoelastic foodstuff material is aligned.

Simultaneously the mass of viscoelastic foodstuff material is heated, in order to lower the viscosity of the foodstuff material and to mobilize the biopolymers within the mass. The aligned mass results in texture of the foodstuff material, being aligned in the direction of the relative rotation between the inner member and the outer member.

After the heating, the texturized foodstuff material in the texturizing chamber is cooled to relieve the pressure inside. Furthermore, the cooling provides that the viscosity of the foodstuff material increases up to a certain extent, which immobilizes the biopolymers again. Accordingly, the texture may be maintained in the foodstuff material.

After cooling, the lid may be removed from the outer member to remove the texturized foodstuff material from the interior of the outer member. Preferably, the foodstuff material may be removed out of the interior of the outer by a notch of the inner member, which interlocks with the foodstuff material upon removal of the inner member from the outer member. After that, the foodstuff material can be further processed into consumer-ready products.

In an embodiment, the method further comprises the step of axially moving the inner member and the outer member with respect to each other to change the volume of the texturizing chamber. This axial movement between the inner member and the outer member is in particular effected to set a certain pressure level in the texturizing chamber. Alternatively or additionally, this axial movement may prevent that the pressure level in the texturizing chamber, for example being caused by the heating of the foodstuff material during use and the corresponding expansion of the foodstuff material, exceeds a certain threshold pressure level.

Upon axially moving the inner member with respect to the outer member, no movements will take place in transverse directions to the rotation axis and the width of the texturizing chamber remains the same. However, the axial distance from a head end wall of the outer member to the inner member will change upon axial movement. Accordingly, the axial movement may effect a change in volume of the portion of the texturizing chamber between the inner member and the head end wall of the outer member. Since the texturizing chamber remains sealed, the mass of the contents of the texturizing chamber, e.g. of the foodstuff material and air in the texturizing chamber, remains the same. Accordingly, the pressure in the texturizing chamber changes upon changing the relative axial position between the inner member and the outer member by axially moving the stationary portion and the rotary portion of the lid assembly.

In an embodiment of the method, the rotating takes place at a rotational velocity in the range between 5-150 rpm. It was found by the inventors that when the foodstuff materiel were to be subjected to a rotational velocity in the range of 5-150 rpm, e.g. for a biopolymer mixture for animal protein substitutes, the texture of the foodstuff material would become as best as possible, namely to accurately mimic that of actual meat, poultry or fish products.

If the foodstuff material were to be subjected to a lower shear rate, the resulting structure in the foodstuff material is only minorly texturized and shows only limited anisotropy.

If, on the other hand, the foodstuff material were to be subjected to a higher shear rate, the resulting food stuff material would be destroyed..

In an embodiment of the method, the heating of the foodstuff material takes place temperature in between 50° C. and 200° C. The required elevated temperature differs per type of foodstuff material, but may for example being in between 50° C. and 200° C. for a protein-rich biopolymer mixture. At these temperatures the pressure in the texturizing chamber increases above the ambient pressure under the influence of the heating, for example being caused by evaporation of liquids, such as water, or by changes in the protein structure under elevated temperatures, in the mass of viscoelastic foodstuff material.

BRIEF DESCRIPTION OF DRAWINGS

Further characteristics of the invention will be explained below, with reference to an embodiment, which are displayed in the appended drawing, in which:

FIG. 1 depicts a cross-sectional view on an embodiment of the food production device according to the present invention.

Throughout the figures, the same reference numerals are used to refer to corresponding components or to components that have a corresponding function.

DETAILED DESCRIPTION OF EMBODIMENTS

FIG. 1 schematically depicts a cross-sectional view on an embodiment of the food production device according to the present invention, to which is referred with reference numeral 1. The food production device 1 comprises an outer member 10, which has a cylindrical wall 11. The cylindrical wall 11 extends around a longitudinal axis L of the device 1 and is, at least in the present embodiment, substantially rotationally symmetric around this longitudinal axis L.

The outer member 10 further comprises a flat bottom wall 12 at a bottom end of the cylindrical wall 11. In the present embodiment, the bottom wall 12 has a circular shape that corresponds to the circular cross-section of the cylindrical wall 11, perpendicular to the longitudinal axis L.

The outer member 10 has an interior that is defined by the cylindrical wall 11 and the bottom wall 12. The bottom wall 12 is integrally connected to the cylindrical wall 11, in order to form a fluid-tight connection between both. The bottom wall 12 comprises a vent hole 13, which defines a closable fluid passage between the interior of the outer member 10 and its surroundings, in order to facilitate removal of foodstuff material from the interior of the outer member 10, after use of the device 1.

The interior of the outer member 10 is accessible from outside via a top end opening of the outer member 10 that is disposed at a top end of the cylindrical wall 11 and that is, seen along the longitudinal axis, disposed opposite to the bottom wall 12. In the embodiment of the device 1 shown in FIG. 1, a lid is mounted on top of the outer member 10, thereby covering the top end opening. Upon removal of this lid, access is allowed into the interior of the outer member 10.

At the top end of the cylindrical wall 11, the outer member 10 comprises a circumferential flange 14. The flange 14 extends around the longitudinal axis L and is, seen in a radially outward direction, located behind the cylindrical wall 11. The flange 14 extends in a plane perpendicular to the longitudinal axis L, around the top end opening, and is configured to abut an annular seal ring 30 during use of the device 1.

The device 1 further comprises a lid assembly 20 with an inner member 21 and a lid 22. In FIG. 1, the lid 22 is mounted on the outer member 10 and over the top end opening thereof. The lid 22 comprises an annular flange 23 that is, at least in the mounted configuration in FIG. 1, aligned perpendicular to the longitudinal axis L and parallel to the flange 14 of the outer member 10. The flanges 14, 23 are clamped against each other by means of an interlocking first locking element of the lid 22 and a corresponding second locking element of the outer member 10. The annular seal ring 30 is disposed in between both flanges 14, 23 in order to form a fluid-tight connection between the interior of the outer member 10 and the environment.

The inner member 21 has an outer wall 24 with a cylindrical shape and a circular cross-section. The inner member 21 is, at least during use of the device 1, shown in FIG. 1, disposed within the interior of the outer member 10. The outer wall 24 of the inner member 21 thereby also extends around the longitudinal axis L in a substantially rotationally symmetric manner and is substantially concentric with the cylindrical wall 11 of the outer member 10.

The outer wall 24 of the inner member 21 faces towards the cylindrical wall 11 of the outer member 10 and a texturizing chamber 2 of the device 1 is formed between the inner member 21 and the outer member 10. The texturizing chamber 2 is thereby formed within the interior of the outer member 10, after placement therein of the inner member 21, which has a width W, defined as the difference between an inner radius $r_i$ of the outer wall 24 and the inner radius $r_o$ of the cylindrical wall 11.

The inner member 21 comprises a cone-shaped end portion 25 as a displacement mechanism, which is located at a bottom end of the inner member 21. The cone-shaped end portion 25 has a tip that faces towards the bottom wall 12 of the outer member 10 when the inner member 21 is located within the outer member 10, e.g. in the configuration in FIG. 1.

As a result of its cone shape, the end portion 25 is configured to penetrate foodstuff material that has been loaded in the interior of the outer member 20, in order to displace the foodstuff material sideways into the texturizing chamber 2. As such, the cone-shaped end portion 25 allows for easier insertion of the inner member 21 into the outer member 10.

The lid 22 of the lid assembly 20 is a stationary portion, which is configured to be secured to the outer member 10. The inner member 21 of the lid assembly 20 is rotatable with respect to the lid 22 around the longitudinal axis L, forming a rotary portion of the lid assembly 20. A shaft 26 of the inner member 21 is thereto held within a bearing 27 of the lid 22, in order to allow relative rotation around the longitudinal axis L.

The device 1 comprises an electric motor (not shown in FIG. 1), which is disposed on the lid 22 and which has an output shaft that is connected to the shaft 26 of the inner member 21. The electric motor is configured to effect a relative rotation between the inner member 21 and the outer member 10 by rotating the inner member 21 with respect to the lid 22.

The lid assembly 20 further comprises an annular shaft seal 28 in between the stationary portion, e.g. the lid 22 and the rotary portion, e.g. the inner member 21. The shaft seal 28 is thereby configured to seal-off the texturizing chamber 2 during use of the device 1 and configured to form a fluid-tight connection between the lid 22 and the inner member 21, in order to prevent leakage of the foodstuff material out of the texturizing chamber 2. The shaft seal 28 is held fixedly in place against the lid 22 and surrounds the inner member 21. During use of the device 1, the shaft seal 28 remains stationary with the lid 22 and the inner member 21 rotates within the shaft seal 28, thereby enabling a rotary seal against the inner member 21.

The lid assembly 20 comprises a filling opening 29 in the lid 22, which forms a closable fluid passage between the texturizing chamber 2 and the surroundings of the device 1. The filling opening 29 extends parallel to the longitudinal axis L and can be used to fill the texturizing chamber 2 after the lid assembly 20 has been mounted on the outer member 1. A valve 31 is disposed on the lid 22, which is, in the configuration shown in FIG. 1, configured to close off the filling opening 29 in the lid 22.

The device 1 further comprises a pressure regulator mechanism in the lid assembly 20, which is configured to regulate a pressure level in the texturizing chamber 2. The pressure regulator mechanism is formed within a closable opening in the lid 22, similar as the filling opening 29.

The pressure regulator mechanism comprises a valve 32 that is slidably disposed within the opening and which has a first surface that faces towards the texturizing chamber 2. The valve 32 is thereby subjected to the pressure level in texturizing chamber 2.

The pressure regulator mechanism further comprises a compression spring 33, which is disposed in the filling opening, in between a closure and a second surface of the valve 32, opposite to the first surface. The compression spring 33 is configured to apply a compression force onto the valve 32, e.g. in the downward vertical direction in FIG. 1, in order to counteract the pressure level in the texturizing chamber 2.

When, during use of the device 1, the pressure level in the texturizing chamber 2 were to increase, for example being caused by the heating of the foodstuff material and the corresponding thermal expansion thereof, the valve 32 would be moved further into the opening, e.g. in the upward vertical direction in FIG. 1. This upward movement would effect compression of the spring 33, resulting in an increased compression force acting on the valve 32.

Accordingly, the volume of the texturizing chamber 2 has decreased as a result of the upward movement of the valve 32. Since the texturizing chamber 2 remains sealed, the foodstuff material is allowed to expand, resulting in a lowered pressure level in the texturizing chamber 2. A new pressure balance is thereby achieved over the valve, between the compression force from the spring 32 and the pressure level in the texturizing chamber 2.

The present invention is further illustrated by means of several embodiments, which are listed below:

Embodiment 1

Food production device, configured to provide texture to a mass of viscoelastic foodstuff material, such as a biopolymer mixture for meat substitutes, which comprises:

- an outer member, comprising a cylindrical wall that extends around a longitudinal axis, wherein an interior of the outer member is defined by the cylindrical wall and wherein the outer member comprises an opening by which access is provided towards its interior,
- an inner member, which comprises an outer wall having a shape that substantially corresponds to the shape of the cylindrical wall of the outer member ,wherein, at least during use, the inner member is disposed in the interior of the outer member and the outer wall of the inner member faces the cylindrical wall of the outer member, wherein, at least during use, a texturizing chamber of the food production device is formed between the outer member and the inner member, for receiving and retaining the mass of viscoelastic foodstuff material during use, and

- a lid, which is configured to be mounted over the opening to at least partially close-off the texturizing chamber from its surroundings, wherein the outer member and the inner member are rotatable with respect to each other around a rotation axis that is parallel to the longitudinal axis, to effect, during use, a shear stress with the outer member and the inner member, which is configured to act onto the foodstuff material in the texturizing chamber, characterized in that, the outer member comprises a head end wall at a first head end thereof, preferably a bottom wall at a bottom end of the outer member, wherein the opening is a head end opening at a second head end of the outer member, opposite to the first head end, preferably a top end opening at a top end of the outer member, wherein the lid is configured to be mounted at the second head end of the outer member to close-off the head end opening, preferably configured to be mounted at the top end of the outer member to close-off the top end opening.

Embodiment 2

Food production device according to embodiment 1, wherein the lid and the inner member together form a lid assembly that is removable from the outer member to allow access to the interior of the outer member.

Embodiment 3

Food production device according to embodiment 2, wherein the lid assembly comprises a stationary portion, which is configured to be attached to the outer member, and a rotary portion within the stationary portion, wherein the rotary portion is rotatable with respect to the stationary portion and wherein the inner member is fixedly connected to the rotary portion.

Embodiment 4

Food production device according to embodiment 3, comprising a shaft seal in between the rotary portion and the stationary portion.

Embodiment 5

Food production device according to any of the embodiments 2-4, wherein the inner member comprises a displacement mechanism, such as a cone-shaped end portion, a convex end portion and/or a screw portion, which faces, at least during use of the device, the head end wall of the outer member.

Embodiment 6

Food production device according to any of the embodiments 2-5, wherein the head end wall of the outer member comprises an inverse cone-shaped end portion, a concave end portion and/or a screw portion, which faces, at least during use of the device, the inner member.

Embodiment 7

Food production device according to any of the embodiments 2-6, wherein the inner member is hollow, having an interior, and wherein the lid defines a through passage towards the interior of the inner member.

Embodiment 8

Food production device according to any of the embodiments 2-7, wherein the lid assembly further comprises an electric motor that is attached to the lid, wherein the electric motor is configured to rotate the inner member with respect to the lid.

Embodiment 9

Food production device according to any of the preceding embodiments, further comprising a frame and an electric motor, wherein the inner member and the electric motor are attached to the frame, and wherein the electric motor is configured to rotate the outer member with respect to the frame and the inner member.

Embodiment 10

Food production device according to any of the preceding embodiments, wherein, at least during use of the device, the inner member is aligned off-centre with the outer member and wherein the rotation axis is offset with respect to the longitudinal axis.

Embodiment 11

Food production device according to any of the preceding embodiments, wherein the lid comprises a first locking element and wherein the outer member comprises a corresponding second locking element at its second head end, wherein the first and second locking elements are configured to interlock, in order to effect closure of the lid on the outer member.

Embodiment 12

Food production device according to any of the preceding embodiments, comprising an annular seal at an interface between the lid and the outer member, for example comprising an annular seal ring in the lid that is configured to abut the cylindrical wall of the outer member at its second head end.

Embodiment 13

Food production device according to any of the preceding embodiments, wherein the cylindrical wall has an inner radius, wherein the outer wall of the inner member has an outer radius, wherein a width of the texturizing chamber is defined as the difference between the inner radius of the cylindrical wall and the outer radius of the outer wall of the inner member, and wherein the width is in a range between 5 mm and 100 mm, preferably in a range between 10 mm and 50 mm.

Embodiment 14

Food production device according to any of the preceding embodiments, wherein the cylindrical wall of the outer member and/or the outer wall of the inner member comprises a corrugated surface to increase contact between the respective wall and the foodstuff material during use of the device, wherein the corrugated surface for example comprises grooves and ridges that are aligned parallel to the longitudinal axis.

Embodiment 15

Food production device according to any of the preceding embodiments, wherein the cylindrical wall of the outer member and/or the outer wall of the inner member comprises a heating device, preferably an electric heating device, such as a resistive heater.

Embodiment 16

Food production device according to any of the preceding embodiments, wherein the device comprises a pressure regulator mechanism, which is configured to regulate a pressure level in the texturizing chamber.

Embodiment 17

Food production device according to embodiments 3 and 16, wherein the stationary portion and the rotary portion are axially movable with respect to each other along the rotation axis and wherein the pressure regulator mechanism is configured to effect axial movements between the stationary portion and the rotary portion in order to move the inner member and the outer member with respect to each other and to change the volume of the texturizing chamber.

Embodiment 18

Food production device according to any of the preceding embodiments, wherein the outer member comprises a vent hole in its cylindrical wall or its head end wall, which is configured to provide a fluid passage between the interior of the outer member and its surroundings.

Embodiment 19

Method for providing texture to a mass of viscoelastic foodstuff material, such as a biopolymer mixture for meat substitutes, which comprises the steps of;

filling an interior of an outer member of a food production device with the mass of viscoelastic foodstuff material through a head end opening of the outer member, placing an inner member in the interior of the outer member through the opening, wherein the inner member comprises an outer wall that at least partially has a circular cross-section, wherein the outer wall faces the cylindrical wall of the outer member, wherein a texturizing chamber is formed between the outer member and the inner member, and wherein the placing of the inner member effects displacing of the foodstuff material into the texturizing chamber, mounting a lid over the opening in the outer member lid to close-off the texturizing chamber from its surroundings, heating the foodstuff material, rotating the inner member and the outer member with respect to each other around a rotation axis to effect a shear stress with the outer member and the inner member, which acts on the foodstuff material in the texturizing chamber, and cooling the foodstuff material after the heating and the rotating.

Embodiment 20

Method according to embodiment 19, further comprising the step of axially moving the inner member and the outer member with respect to each other to change the volume of the texturizing chamber.

The invention claimed is:

1. A food production device, configured to provide texture to a mass of viscoelastic foodstuff material, which comprises:

an outer cylinder, comprising a cylindrical wall that extends around a longitudinal axis, wherein an interior of the outer cylinder is defined by the cylindrical wall and wherein the outer cylinder comprises an opening by which access is provided towards its interior, an inner cylinder, which comprises an outer wall having a shape that substantially corresponds to the shape of the cylindrical wall of the outer cylinder, wherein the inner cylinder is disposed in the interior of the outer cylinder and the outer wall of the inner cylinder faces the cylindrical wall of the outer cylinder, wherein a closed-off texturizing chamber of the food production device is formed between the outer cylinder and the inner cylinder having an internal volume, for receiving and retaining the mass of viscoelastic foodstuff material, and a lid, which is configured to be mounted over the opening to close- off the texturizing chamber from its surroundings and configured to be opened to provide access towards the texturizing chamber when the texturizing has finished, wherein the outer cylinder and the inner cylinder are rotatable with respect to each other around a rotation axis that is parallel to the longitudinal axis, to effect a shear stress with the outer cylinder and the inner cylinder, which is configured to act onto the foodstuff material in the texturizing chamber, wherein the outer cylinder comprises a head end wall at a first head end thereof, wherein the opening is a head end opening at a second head end of the outer cylinder, opposite to the first head end, wherein the lid is configured to be mounted at the second head end of the outer cylinder to close-off the head end opening, wherein the internal volume of the texturizing chamber has an uninterrupted annular shape extending along a longitudinal axis, wherein the internal volume of the texturizing chamber is closed and devoid of any openings, ports, valves, conduits, or interfaces permitting passage of the foodstuff material; and wherein the texturizing chamber prevents transfer of any solid, liquid, or gaseous material between the internal volume and an external environment.

2. The food production device according to claim 1, wherein the lid and the inner cylinder together form a lid assembly that is removable from the outer cylinder to allow access to the interior of the outer cylinder.

3. The food production device according to claim 2, wherein the lid assembly comprises a stationary portion, which is configured to be attached to the outer cylinder, and a rotary portion within the stationary portion, wherein the rotary portion is rotatable with respect to the stationary portion and wherein the inner cylinder is fixedly connected to the rotary portion.

4. The food production device according to claim 2, wherein the inner cylinder comprises a displacement mechanism, which faces the head end wall of the outer cylinder.

5. The food production device according to claim 2, wherein the head end wall of the outer cylinder comprises an inverse cone-shaped end portion, a concave end portion and/or a screw portion, which faces the inner cylinder.

6. The food production device according to claim 2, wherein the inner cylinder is hollow, having an interior, and wherein the lid has an annular shape that defines a through passage towards the interior of the inner cylinder.

7. The food production device according to claim 2, wherein the lid assembly further comprises an electric motor that is attached to the lid, wherein the electric motor is configured to rotate the inner cylinder with respect to the lid.

8. The food production device according to claim 1, wherein the lid comprises a first locking element and wherein the outer cylinder comprises a corresponding second locking element at its second head end, wherein the first and second locking elements are configured to interlock, in order to effect closure of the lid on the outer cylinder.

9. The food production device according to claim 1, comprising an annular seal at an interface between the lid and the outer cylinder.

10. The food production device according to claim 1, wherein the cylindrical wall has an inner radius, wherein the outer wall of the inner cylinder has an outer radius, wherein a width of the texturizing chamber is defined as the difference between the inner radius of the cylindrical wall and the outer radius of the outer wall of the inner cylinder, and wherein the width is in a range between 5 mm and 100 mm.

11. The food production device according to claim 1, wherein the cylindrical wall of the outer cylinder and/or the outer wall of the inner cylinder comprises a corrugated surface to increase contact between the respective wall and the foodstuff material.

12. The food production device according to claim 1, further comprising a heater, which is configured to heat the texturizing chamber to heat the mass of viscoelastic foodstuff material.

13. The food production device according to claim 1, wherein the heater is provided in the cylindrical wall of the outer cylinder and/or the outer wall of the inner cylinder.

14. The food production device according to claim 1, wherein the device comprises a pressure regulator, which is configured to regulate a pressure level in the texturizing chamber.

15. The food production device according to claim 1, wherein the outer cylinder comprises a vent hole in its cylindrical wall or its head end wall, which is configured to provide a fluid passage between the interior of the outer cylinder and its surroundings.

* * * * *